(12) United States Patent
Chiang et al.

(10) Patent No.: US 10,789,449 B2
(45) Date of Patent: Sep. 29, 2020

(54) ELECTRONIC DEVICE FOR DISTINGUISHING BETWEEN FINGERPRINT FEATURE POINTS AND NON-FINGERPRINT FEATURE POINTS AND METHOD FOR THE SAME

(71) Applicant: EGIS TECHNOLOGY INC., Taipei (TW)

(72) Inventors: Yuan-Lin Chiang, Taipei (TW); Yu-Chun Cheng, Taipei (TW)

(73) Assignee: EGIS TECHNOLOGY INC., Taipei (TW)

( * ) Notice: Subject to any disclaimer, the term of this patent is extended or adjusted under 35 U.S.C. 154(b) by 191 days.

(21) Appl. No.: 16/194,712

(22) Filed: Nov. 19, 2018

(65) Prior Publication Data

US 2019/0228201 A1    Jul. 25, 2019

Related U.S. Application Data

(60) Provisional application No. 62/621,639, filed on Jan. 25, 2018.

(30) Foreign Application Priority Data

Jul. 26, 2018   (CN) .......................... 2018 1 0838053

(51) Int. Cl.
   *G06K 9/00*   (2006.01)
(52) U.S. Cl.
   CPC .............................. *G06K 9/00067* (2013.01)

(58) Field of Classification Search
   CPC ........................................... G06K 9/00–00194
   See application file for complete search history.

(56) References Cited

U.S. PATENT DOCUMENTS

| 7,200,753 B1* | 4/2007 | Shinzaki | G06F 21/32 |
| | | | 704/E17.003 |
| 8,358,814 B2* | 1/2013 | Monden | G06K 9/036 |
| | | | 382/124 |
| 8,520,914 B2* | 8/2013 | Niinuma | G06K 9/00093 |
| | | | 340/5.83 |

(Continued)

FOREIGN PATENT DOCUMENTS

| CN | 1043580 A | 7/1990 |
| CN | 103886297 B | 1/2017 |

(Continued)

*Primary Examiner* — Patrick F Marinelli
(74) *Attorney, Agent, or Firm* — Li & Cai Intellectual Property (USA) Office (57) ABSTRACT

An electronic device for distinguishing between fingerprint feature points and non-fingerprint feature points and a method for the same are provided. A plurality of feature points are extracted from a fingerprint input image, and non-fingerprint feature points are distinguished from fingerprint feature points and deleted. Accordingly, the electronic device for distinguishing between fingerprint feature points and non-fingerprint feature points and the method for the same can prevent non-fingerprint feature points from existing in a fingerprint registration template of a user, so as to protect fingerprint recognition from being affected by non-fingerprint feature points, thereby increasing safety and accuracy of identity authentication.

12 Claims, 8 Drawing Sheets

(56) References Cited

U.S. PATENT DOCUMENTS

| | | | |
|---|---|---|---|
| 2009/0052752 A1* | 2/2009 | Monden | G06K 9/00093 |
| | | | 382/124 |
| 2009/0245596 A1* | 10/2009 | Niinuma | G06K 9/00093 |
| | | | 382/124 |
| 2010/0060417 A1* | 3/2010 | Niinuma | G06F 21/32 |
| | | | 340/5.82 |
| 2016/0110583 A1 | 4/2016 | Kuo et al. | |
| 2016/0171280 A1* | 6/2016 | Han | G06K 9/00597 |
| | | | 348/77 |
| 2019/0220646 A1* | 7/2019 | Chiang | G06K 9/00026 |
| 2019/0228201 A1* | 7/2019 | Chiang | G06K 9/00067 |

FOREIGN PATENT DOCUMENTS

| | | | | |
|---|---|---|---|---|
| TW | I231919 B | 5/2005 | | |
| TW | I298127 B | 6/2008 | | |
| WO | WO-2018141119 A1 * | 8/2018 | | G06K 9/00 |

\* cited by examiner

ELECTRONIC DEVICE FOR DISTINGUISHING BETWEEN FINGERPRINT FEATURE POINTS AND NON-FINGERPRINT FEATURE POINTS AND METHOD FOR THE SAME

CROSS-REFERENCE TO RELATED PATENT APPLICATION

This application claims the benefit of priority to China Patent Application No. 201810838053.9, filed on Jul. 26, 2018 in the People's Republic of China. The entire content of the above identified application is incorporated herein by reference.

This application claims the benefit of priority to U.S. Provisional Patent Application Ser. No. 62/621,639, filed on Jan. 25, 2018. The above identified application is incorporated herein by reference in its entirety.

FIELD OF THE DISCLOSURE

The present disclosure relates to an electronic device for recognizing fingerprint feature points and a method for the same, and more particularly to an electronic device for distinguishing between fingerprint feature points and non-fingerprint feature points and a method for the same.

BACKGROUND OF THE DISCLOSURE

With the advancement of technology, electronic devices have begun to utilize biometrics as a means for identifying users. For example, fingerprint recognition, iris recognition, voiceprint recognition or other recognition techniques have been utilized. Since the equipment required for fingerprint recognition are of lower cost than that of other biometric recognitions, fingerprint recognition has become a common means for identity authentication.

Currently, fingerprint feature points are the mostly used for fingerprint recognition. For example, the user touches the sensing platform of the fingerprint sensor with the surface of the finger. The fingerprint sensor obtains the user's fingerprint image by utilizing internal sensing components such as ultrasonic sensors, capacitive sensors, pressure sensors or optical sensors. The electronic device then extracts fingerprint feature points from the fingerprint image and compares the fingerprint feature points to a fingerprint registration template to confirm the identity of the user. During the process of comparison, if the number of the fingerprint feature points being successfully verified (that is, identical or similar feature points can be found in the fingerprint registration template) is more than a default value, the electronic device will determine that the identification performed by the fingerprint sensor is successful, that is, the detected fingerprint image passes the verification. At this time, the electronic device updates the fingerprint registration template of the user according to the fingerprint feature points included in the verified fingerprint image, thereby obtaining more fingerprint feature points of the registered fingerprint.

However, if there are cracks, stains or fixed patterns on the sensing platform (for example, a film having fixed patterns may be attached on the sensing platform by people of malicious intent), the conventional fingerprint sensor will not only sense the fingerprint patterns, but also sense the cracks, stains or fixed patterns (collectively referred to as non-fingerprint patterns hereinafter). In other words, the sensed fingerprint image will include fingerprint patterns and non-fingerprint patterns. When the conventional electronic device extracts feature points from the fingerprint image, the fingerprint feature points from the fingerprint patterns and the non-fingerprint feature points from the non-fingerprint patterns will both be extracted, and the non-fingerprint feature points may be regarded as the fingerprint feature points. Since the conventional electronic device would update the non-fingerprint feature points into the user's fingerprint registration template after each successful verification, the user's fingerprint registration template will have more and more non-fingerprint feature points.

Figure 1A:
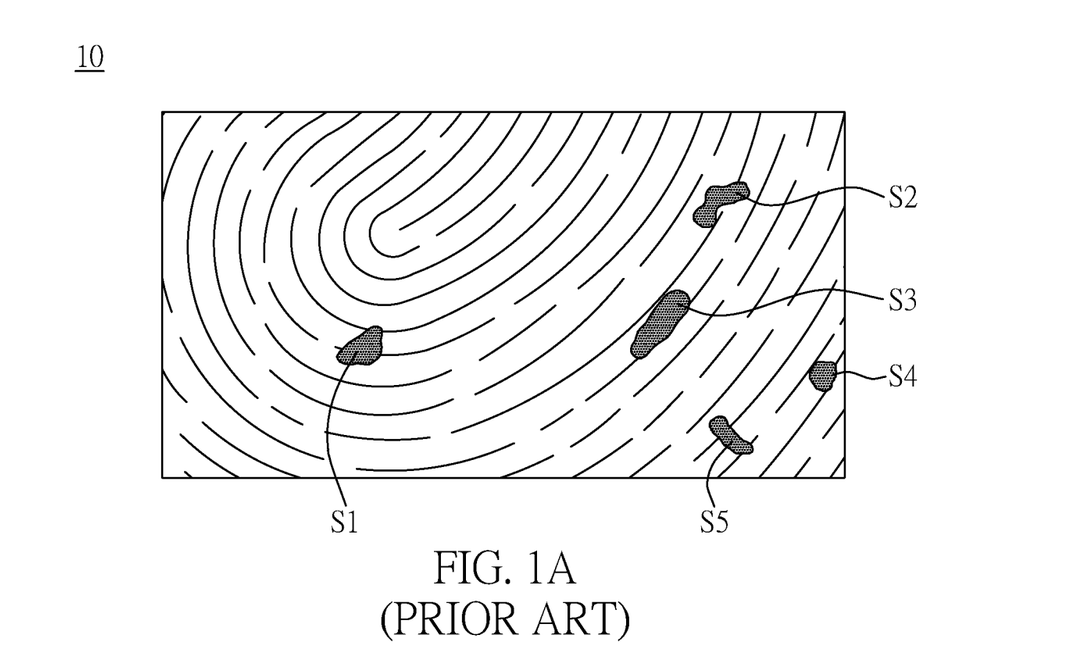
FIG. 1A is a schematic diagram showing a conventional fingerprint image.
Figure 1B:
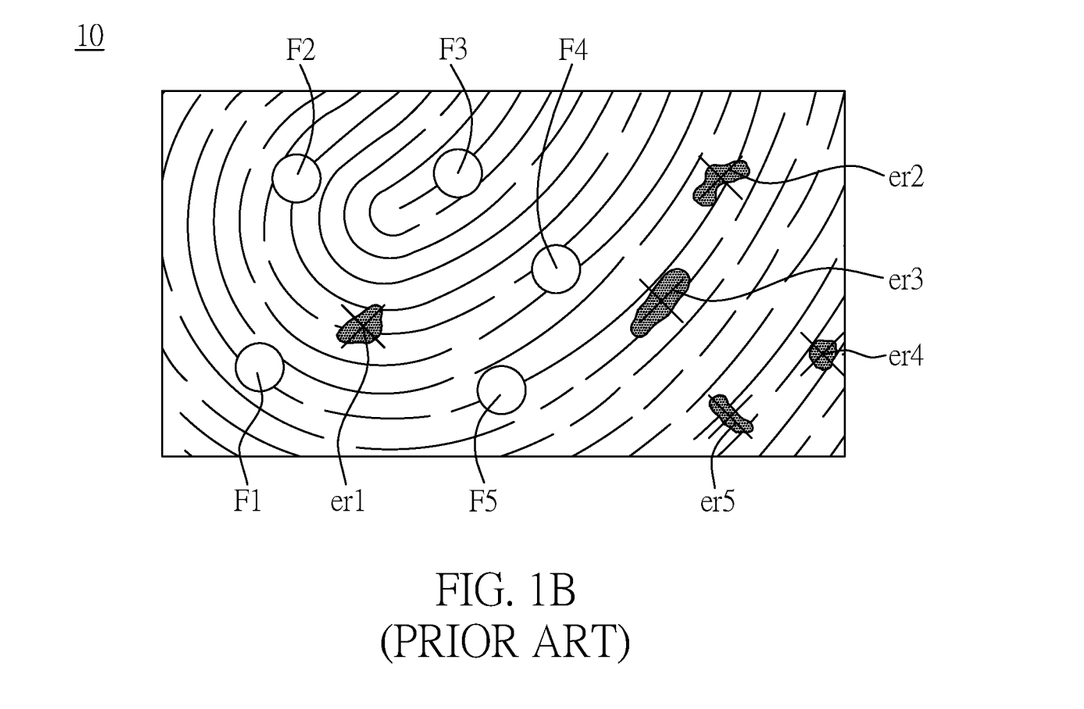
FIG. 1B is a schematic diagram showing fingerprint features and non-fingerprint features of the conventional fingerprint image.

For example, as shown in FIG. 1A, five fixed patterns (which can also be stains or cracks) are present on the sensing platform, resulting in the sensed fingerprint image 10 containing five non-fingerprint patterns S1, S2, S3, S4, and S5. The conventional electronic device will then extract ten feature points from the fingerprint image 10 (that is, five fingerprint feature points F1, F2, F3, F4 and F5 of the user and five non-fingerprint feature points er1, er2, er3, er4, er5 from non-fingerprint patterns S1-S5 as shown in FIG. 1B). The conventional electronic device will compare the above-mentioned feature points with the user's fingerprint registration template. Since the above feature points includes fingerprint feature points, the electronic device determines that the fingerprint image 10 passes the verification based on the fingerprint feature points that can be successfully verified, and updates the all of the foregoing feature points into the fingerprint registration template. That is to say, the five non-fingerprint feature points er1-er5 of the non-fingerprint patterns S1-S5 are also updated into the fingerprint registration template.

When the number of non-fingerprint feature points included in the fingerprint registration template is greater than the above-mentioned default value, anyone would be able to pass the fingerprint verification. This is because any fingerprint images input by any person will contain the identical non-fingerprint patterns, and the conventional electronic device will extract such non-fingerprint feature points for comparing with the non-fingerprint feature points contained in the fingerprint registration template. It will then be determined that the verification is successful, and the fingerprint image will be authenticated.

Next, the conventional electronic device will further update the fingerprint feature points of such an unauthorized user into the fingerprint registration template. In other words, even if the film attached by people of malicious intent is removed from the sensing platform in the future, the unauthorized user can still pass fingerprint verification through the unauthorized user's fingerprint feature points that have been updated into the fingerprint registration template.

SUMMARY OF THE DISCLOSURE

The present disclosure provides an electronic device for distinguishing between fingerprint feature points and non-fingerprint feature points and a method for the same which can prevent non-fingerprint feature points from existing in a fingerprint registration template of a user, so as to prevent fingerprint recognition results from being affected by the non-fingerprint feature points, thereby increasing the safety and accuracy of identity authentication.

The present disclosure provides a method for distinguishing between fingerprint feature points and non-fingerprint feature points, applicable to an electronic device. The electronic device of the present disclosure comprises a fingerprint sensor, a processor and a storage unit. The method of the present disclosure comprises: obtaining a fingerprint input image by using the fingerprint sensor; extracting a plurality of input feature points from the fingerprint input image by the processor, wherein each of the input feature points has an input position and an input feature vector; obtaining a plurality of reference feature points by the processor, wherein each of the reference feature points has a reference position and a reference feature vector; comparing, by the processor, the plurality of input feature points and the plurality of reference feature points to find at least one input feature point with the input position and the input feature vector being respectively the same as the reference position and the reference feature vector of any of the plurality of reference feature points, and determining the found at least one input feature point as the non-fingerprint feature point.

The present disclosure provides an electronic device for distinguishing between fingerprint feature points and non-fingerprint feature points, including a fingerprint sensor and a processor. The fingerprint sensor is used for obtaining a fingerprint input image, the processor is electrically coupled to the fingerprint sensor and is configured to perform the following steps: extracting a plurality of input feature points from the fingerprint input image, wherein each of the input feature points has an input position and an input feature vector; obtaining a plurality of reference feature points, wherein each of the reference feature points has a reference position and a reference feature vector; and comparing the plurality of input feature points and the plurality of reference feature points, to find at least one input feature point with the input position and the input feature vector being the same as the reference position and the reference feature vector of any of the plurality of reference feature points, and determining the found at least one input feature point as at least one non-fingerprint feature point.

In order to further understand the features and technical content of the present disclosure, reference is made to the following detailed instructions and accompanying drawings for the present disclosure, however, the accompanying drawings are provided for reference only and are not intended to limit the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In the following, the present disclosure will be described in detail by way of illustration of various exemplary embodiments of the application. However, concepts of the present disclosure may be implemented in various different forms, and should not be construed as limited to the exemplary embodiments described in this context. In addition, the same reference numbers in the drawings can be used to represent similar components.

Figure 2:
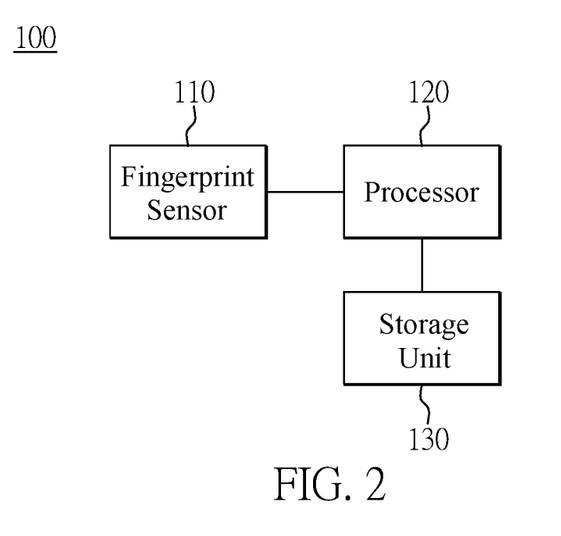
FIG. 2 is a schematic diagram showing an electronic device for distinguishing between fingerprint feature points and non-fingerprint feature points according to an embodiment of the present disclosure.

Firstly, reference is made to FIG. 2, which is a schematic diagram showing an electronic device for distinguishing between fingerprint feature points and non-fingerprint feature points according to an embodiment of the present disclosure. As shown in FIG. 2, an electronic device 100 includes a fingerprint sensor 110, a processor 120 and a storage unit 130. The fingerprint sensor 110 senses a fingerprint of a user to produce a fingerprint input image Im. In this embodiment, the fingerprint sensor 110 can be an ultrasonic sensor, a capacitive sensor, a pressure sensor, an optical sensor or other sensors capable of sensing the fingerprint image, and is not limited by the present disclosure.

In this embodiment, the electronic device 100 may be a smart phone, tablet computer, notebook computer or other electronic devices capable of performing fingerprint recognition, and are not limited by the present disclosure. As shown in FIG. 2, the user can touch a sensing platform of the fingerprint sensor 110 of the electronic device 100 with the fingerprint surface of the finger.

Figure 3:
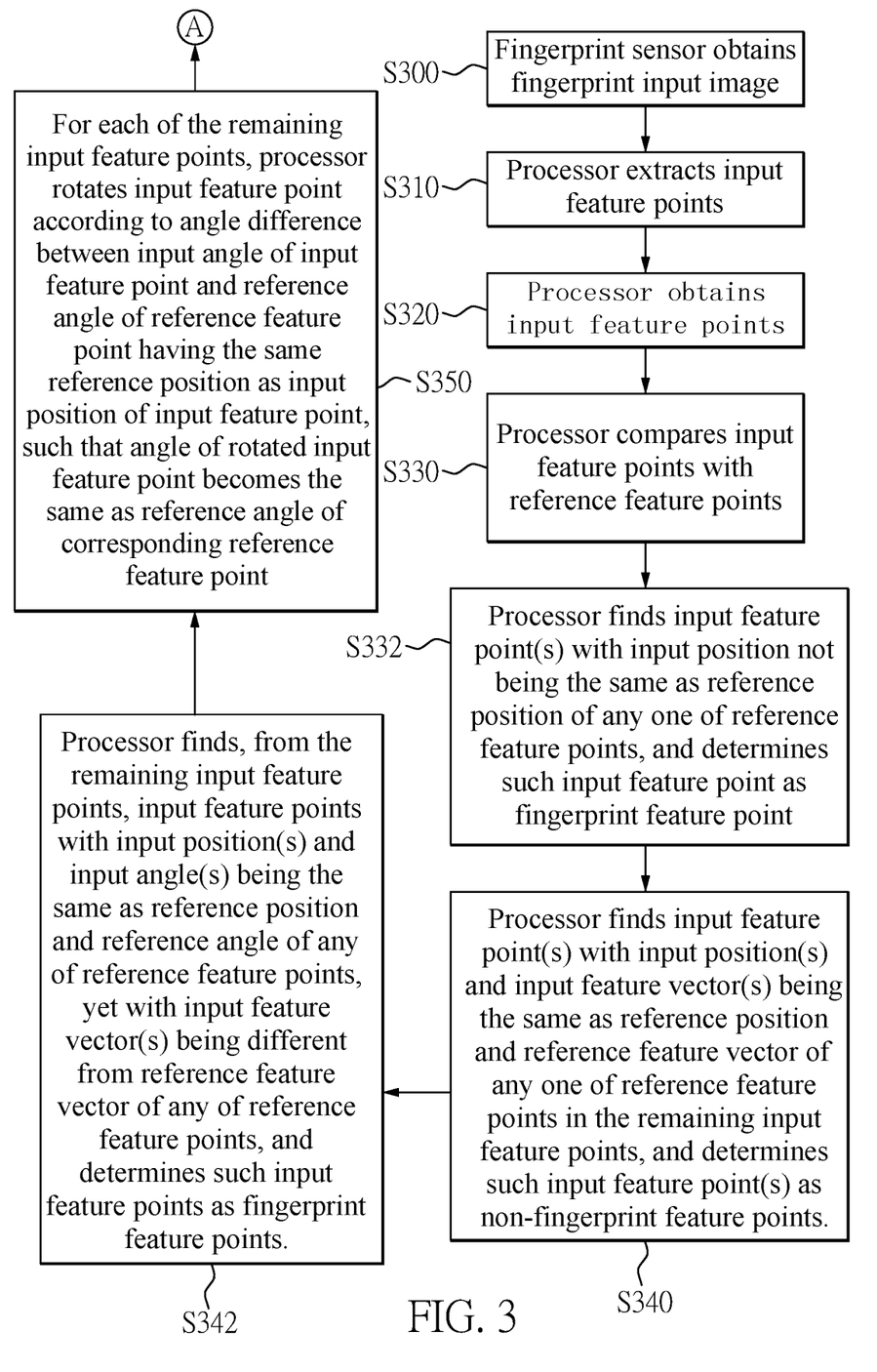
FIG. 3 is a flow chart showing a method for distinguishing between fingerprint feature points and non-fingerprint feature points according to an embodiment of the present disclosure.

Further, the processor 120 is electrically connected to the fingerprint sensor 110 and the storage unit 130, and is configured to distinguish fingerprint feature points from non-fingerprint feature points by performing the following steps. With reference to FIG. 3, which is a flow chart showing a method for distinguishing between fingerprint feature points and non-fingerprint feature points according to an embodiment of the present disclosure, the processor 120 first obtains the fingerprint input image Im via the fingerprint sensor 110 (step S300).

Figure 4A:
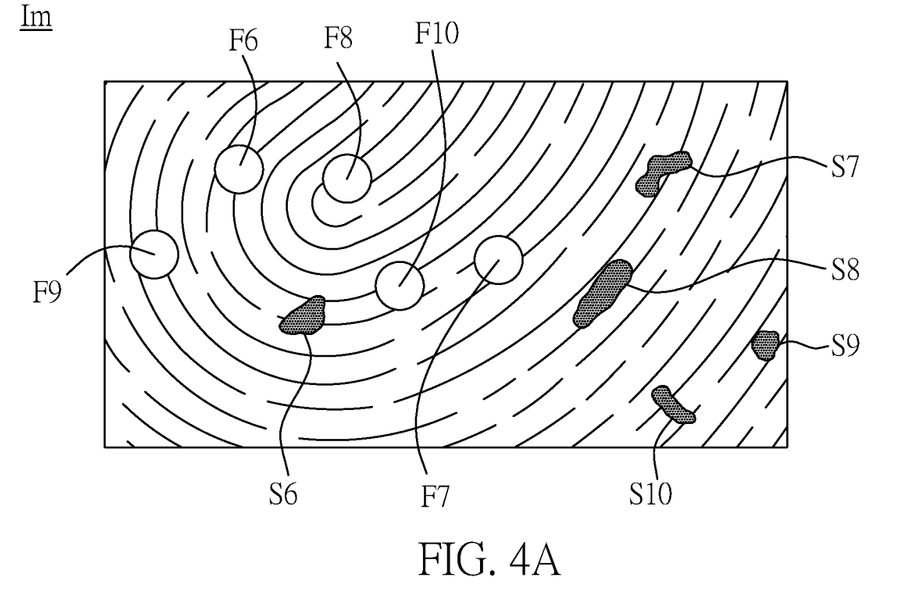
FIG. 4A is a schematic diagram showing a fingerprint input image according to an embodiment of the present disclosure.

Reference is next made to FIG. 4A, which is a schematic diagram showing a fingerprint input image according to an embodiment of the present disclosure. As shown in FIG. 4A, the fingerprint input image Im exemplarily has 5 non-fingerprint patterns S6-S10 and 5 fingerprint patterns f6-f10 of a user.

Figure 4B:
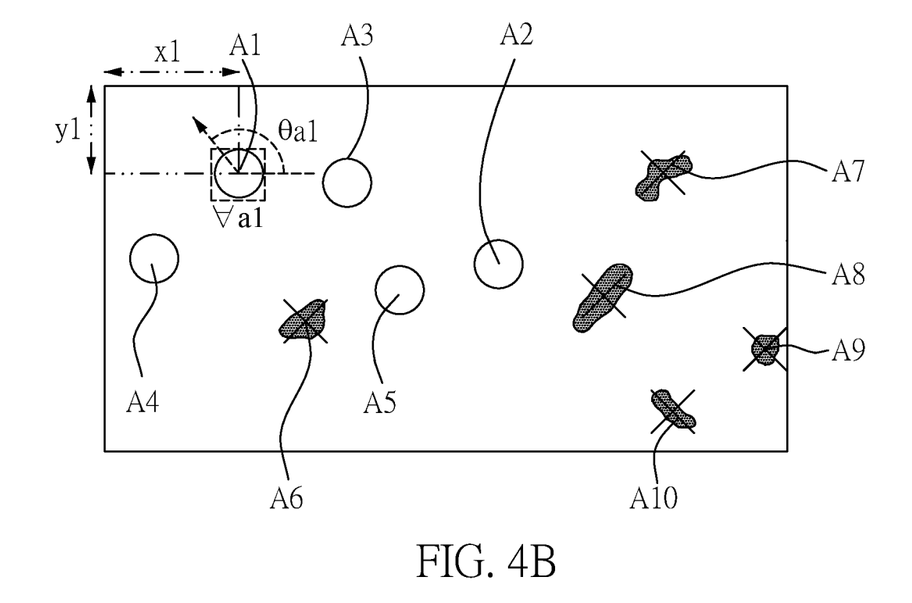
FIG. 4B is a schematic diagram showing a plurality of feature points obtained from the fingerprint input image.

Next, the processor 120 obtains a plurality of input feature points from the fingerprint input image Im (step S310). Reference is then made to FIG. 4B, which is a schematic diagram showing a plurality of feature points obtained from the fingerprint input image. As shown in FIG. 4B, the processor 120 will extract input feature points A1, A2, A3, A4, A5, A6, A7, A8, A9 and A10 from the fingerprint input image Im. In this case, the processor 120 obtains the input feature points A1-A5 from the fingerprint patterns F6-F10 of the user, and the input feature points A6-A10 from the non-fingerprint patterns S6-S10.

It is worth noting that each of the input feature points A1-A10 has an input position, an input angle and an input feature vector. Taking the input feature point A1 as an example, the input feature point A1 has an input position (x1, y1), an input angle θa1 and an input feature vector $\forall$a1. The input position (x1, y1) represents a position coordinate of the input feature point A1. The input angle θa1 represents an angle of the input feature point A1. The input feature vector $\forall$a1 represents a local feature description around the input feature point A1. For example, the input feature vector $\forall$a1 can be obtained by substituting the input position (x1, y1), the input angle θa1, and image data in a predetermined area around the input feature point A1 (referring to surrounding image data hereinafter) into a function. i.e. $\forall$=f(θ, x, y, the surrounding image data). In the present embodiment, the processor 120 can calculate gradients of the input feature point A1 in different directions by, for example, a Sobel operator and a Scharr operator, to calculate the input angle θa1 of the input feature point A1. For example, the processor 120 calculates a horizontal gradient Gx and a vertical gradient Gy of the input feature point A1 in both horizontal and vertical directions, and then uses an inverse tangent function, i.e., arctan (Gx/Gy), to obtain the input angle θa1 of the input feature point A1. That is, the input angle θa1 is a gradient angle of edge of the input feature point A1 calculated by utilizing the Sobel operator and the Scharr operator.

Here, the gradient angle of edge of the input feature point A1 calculated by utilizing the Sobel operator and the Scharr operator, i.e. the input angle θa1 can be calculated from the following equation (1)~(3):

$$Gx \begin{bmatrix} -1 & 0 & +1 \\ -2 & 0 & +2 \\ -1 & 0 & +1 \end{bmatrix} * (\text{Surrounding Image Data}) \quad \text{Equation (1)}$$

$$Gy \begin{bmatrix} -1 & -2 & -1 \\ 0 & 0 & 0 \\ +1 & +2 & +1 \end{bmatrix} * (\text{Surrounding Image Data}) \quad \text{Equation (2)}$$

$$\theta = \arctan\left(\frac{Gy}{Gx}\right) \quad \text{Equation (3)}$$

In addition, in other embodiments, the input angle θa1 of the input feature point A1 can also be calculated by other calculation methods or equations and can also be expressed by other methods or equations, which is not limited in the present disclosure.

As mentioned above, the input feature vector $\forall$a1 can be calculated from the input position (x1, y1), the input angle θa1 and the surrounding image data. In this embodiment, the input feature vector $\forall$a1 of the input feature point A1 can be represented by an input feature function f1 (θa1, x1, y1, the surrounding image data). In other embodiments, the input feature vector $\forall$a1 of the input feature point A1 may also be represented by other means or functions, which is not limited in the present disclosure.

Reference is further made to FIGS. 3 and 4B. After the plurality of input feature points A1-A10 of the fingerprint input image Im are obtained (step 310), the processor 120 can retrieve a plurality of reference feature points from the storage unit 130. The plurality of reference feature points may be reference feature points extracted by the processor 120 from another fingerprint image inputted before the fingerprint input image Im, i.e. a fingerprint reference image. In other embodiments, the electronic device 100 may also require the user to press two times on the sensing platform of the fingerprint sensor 110, and the processor 120 will obtain two fingerprint images successively, one of which serves as the fingerprint input image IM, and the other serving as the fingerprint reference image.

Figure 4C:
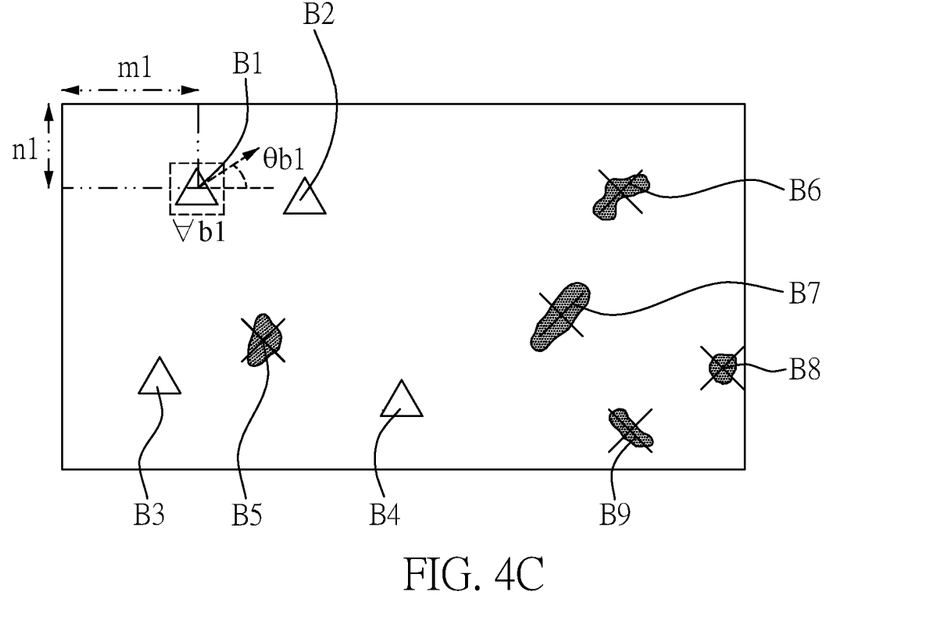
FIG. 4C is a schematic diagram showing a plurality of reference feature points.

FIG. 4C is a schematic diagram showing a plurality of reference feature points B1-B9. The reference feature points B1-B4 are derived from the fingerprint patterns, and the reference feature points B5-B9 are derived from the non-fingerprint patterns S6-S10.

Similarly, each of the reference feature points B1-B9 also has a reference position, a reference angle and a reference feature vector. Taking the reference feature point B1 as an example, the reference feature point B1 has a reference position (M1, N1), a reference angle θb1 and a reference feature vector $\forall$b1. Similarly, the reference position (M1, N1) represents a position coordinate of the reference feature point B1, the reference angle θb1 represents an angle of the reference feature point B1, and the reference feature vector $\forall$B1 represents a local feature description surrounding the reference feature point B1.

The processor 120 can take the previous input feature points extracted from the fingerprint input images as the reference feature points to be stored in the storage unit 130. The processor 120 may also select one or more sets from the plurality of sets of input feature points obtained from the previous fingerprint input images as reference feature points to be stored in the storage unit 130. The present disclosure is not limited in this aspect.

After the processor 120 obtains the reference feature points, the processor 120 compares the input feature points A1-A10 with the reference feature points B1-B9 of FIG. 4C (step S330).

It should be noted that each time when the user places a finger onto the sensing platform, the fingerprint sensor 110 will obtain a corresponding fingerprint image. The obtained fingerprint images may include different fingerprint patterns since different portions of the finger touch the sensing platform and are sensed. However, non-fingerprint patterns will be the same regardless of the placement of the finger.

In step S332, the processor 120 finds the input feature point(s) with the input position not being the same as the reference position of any one of the reference feature points, and determines said input feature point as the fingerprint feature point.

Figure 6:
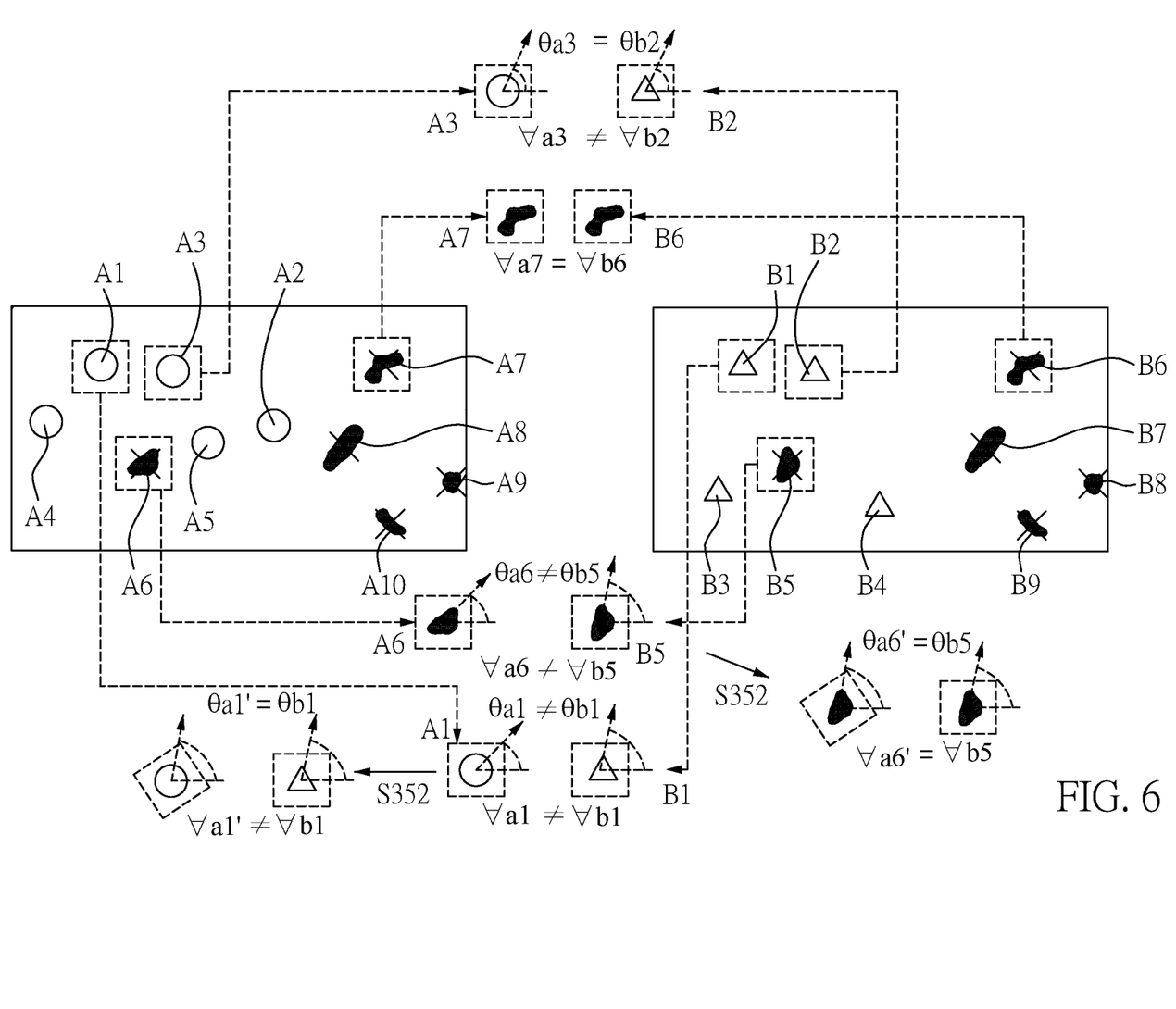
FIG. 6 is a schematic diagram showing the fingerprint feature points being distinguished from the non-fingerprint feature points according to an embodiment of the present disclosure.

Reference is now made to FIG. 6, the left side thereof being a schematic diagram showing a distribution of the input feature points A1-A10, and the right side thereof being a schematic diagram showing a distribution of the reference feature points B1-B9. In the present embodiment, since the input positions of the input feature points A2, A4 and A5 are different from any one of the reference feature points, the processor 120 determines the input feature points A2, A4 and A5 as fingerprint feature points.

In step S340, the processor 120 finds the input feature point(s) with input position(s) and input feature vector(s) being the same as the reference position and the reference feature vector of any one of the reference feature points in the remaining input feature points (i.e., input feature points A1, A3, and A6-A10), and determines said input feature point(s) as non-fingerprint feature points.

As shown in FIG. 6, in the present embodiment, the input positions and the input feature vectors of the input feature points A7-A10 are the same as the reference positions and the reference feature vectors of the reference feature points B6-B9, respectively. For example, the input position and the input feature vector $\forall$a1 of the input feature point A7 are the same as the reference position and the reference feature vector $\forall$b6 of the reference feature point B6. Therefore, the processor 120 determines the input feature points A7-A10 as non-fingerprint feature points.

In step S342, the processor 120 finds, from the remaining input feature points (i.e., input feature points A1, A3, A6), the input feature point(s) with input position(s) and input angle(s) being the same as the reference position and the reference angle of any of the reference feature points, yet with input feature vector(s) being different from the reference feature vector of any of the reference feature points, and the processor 120 determines said input feature points as the fingerprint feature points.

As shown in FIG. 6, in the present embodiment, the input position and the input angle $\theta$a3 of the input feature point A3 are the same as the reference position and the reference angle $\theta$b2 of the reference feature point B2, but the input feature vector $\forall$a3 of the input feature point A3 is different from the reference feature vector $\forall$b2 of the reference feature point B2. Therefore, the processor 120 determines the input feature point A3 as a fingerprint feature point.

In step S350, for each of the remaining input feature points (i.e., input feature points A1 and A6), the processor 120 rotates the input feature point according to an angle difference between the input angle of the input feature point and the reference angle of the reference feature point having the same reference position as the input position of the input feature point, such that the angle of the rotated input feature point becomes the same as the reference angle of the corresponding reference feature point.

Figure 5:
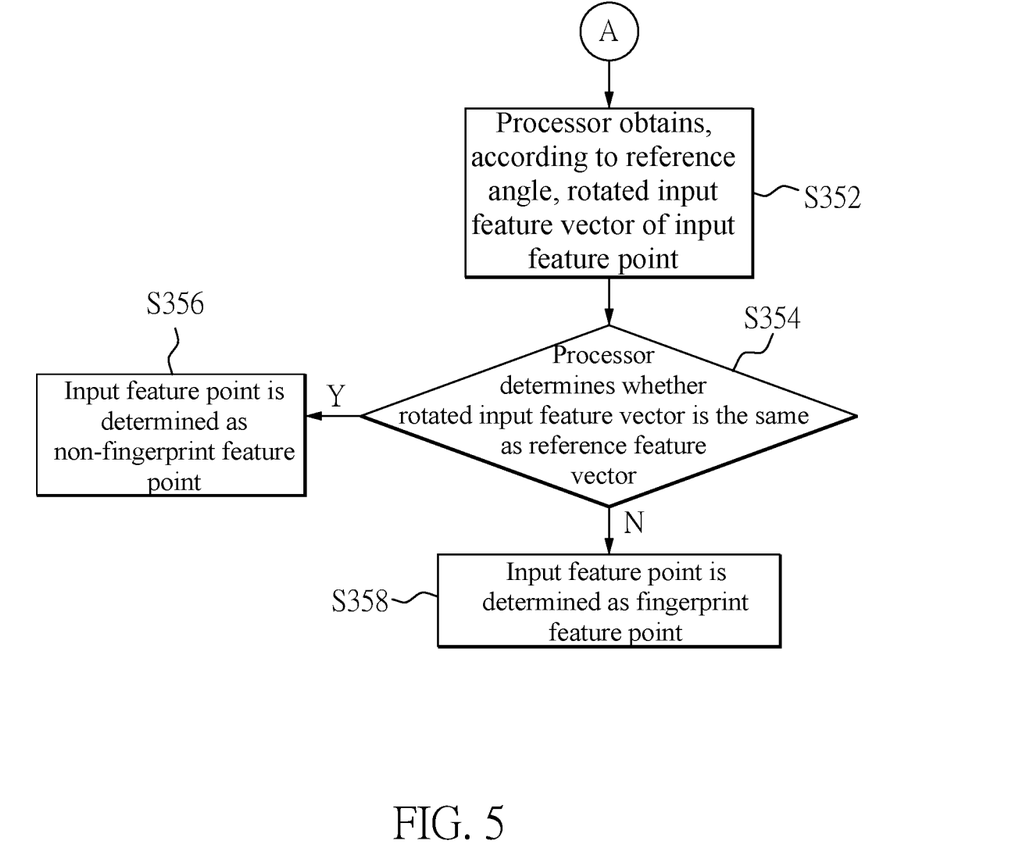
FIG. 5 is a flow chart in continuance of FIG. 3, which shows a method for distinguishing between fingerprint feature points and non-fingerprint feature points according to an embodiment of the present disclosure.

Reference is further made to FIG. 5, which is a flow chart in continuance of FIG. 3 showing a method for distinguishing between fingerprint feature points and non-fingerprint feature points according to an embodiment of the present disclosure. In step S352, the processor 120 obtains, according to the reference angle, the rotated input feature vector of the input feature point. That is, the processor 120 substitutes the reference angle into the input feature function $\forall$=f ($\theta$, x, y, surrounding image data) to calculate the rotated input feature vector.

In step S354, the processor 120 determines whether the rotated input feature vector is the same as the reference feature vector. If the rotated input feature vector is identical to the reference feature vector, the input feature point is determined as the non-fingerprint feature point. In step S358, if the rotated input feature vector is not identical to the reference feature vector, the input feature point is determined as the fingerprint feature point.

As shown in FIG. 6, in the present embodiment, the input position of the input feature point A1 is the same as the reference position of the reference feature point B1, but the input angle $\theta$a1 and the input feature vector $\forall$a1 of the input feature point A1 is different from the reference angle $\theta$b1 and the reference feature vector $\forall$b1 of the reference feature point B1. Therefore, the processor 120 calculates an angle difference between the input angle $\theta$a1 of the input feature point A1 and the reference angle $\theta$b1 of the reference feature point B1, and rotates the input feature point A1 based on the angle difference. The rotated input angle $\theta$a1' will be the same as the reference angle $\theta$b1. Next, the processor 120 calculates a rotated input feature vector $\forall$a1' of the input feature point A1. Since the rotated input feature vector $\forall$a1' of the input feature point A1 is different from the reference feature vector $\forall$b1 of the reference feature point B1, the processor 120 determines the input feature point A1 as the fingerprint feature point.

Further, since the input feature point A1 and the reference feature point B1 are both from fingerprint patterns, unless the input feature point A1 and the reference feature point B1 are from the same fingerprint pattern, the features of the images surrounding them will not be the same. That is to say, as long as the fingerprint feature points are extracted from different fingerprint patterns, even if such fingerprint feature points have the same position, their surrounding image data will be different regardless of whether their angles are the same or not. Namely, fingerprint feature points from different fingerprint patterns will have different feature vectors.

As shown in FIG. 6, in the present embodiment, the input position of the input feature point A6 is the same as the reference position of the reference feature point B5, but the input angle $\theta$a6 and the input feature vector $\forall$a6 of the input feature point A6 is different from the reference angle $\theta$b5 and the reference feature vector $\forall$b5 of the reference feature point B5. Therefore, the processor 120 calculates an angle difference between the input angle $\theta$a6 of the input feature point A6 and the reference angle $\theta$b5 of the reference feature point B5, and rotates the input feature point A6 based on the angle difference. The rotated input angle $\theta$a6' will be the same as the reference angle $\theta$b5. Next, the processor 120 calculates a rotated input feature vector $\forall$a6' of the input feature point A6. Since the rotated input feature vector ∀a6' of the input feature point A1 is the same as the reference feature vector ∀b5 of the reference feature point B5, the processor 120 determines the input feature point A6 as a non-fingerprint feature point.

Further, since the input feature point A6 and the reference feature point B5 are both from one non-fingerprint pattern, i.e., the non-fingerprint pattern S1 in FIG. 1A, the surrounding image data of the input feature point A6 and the reference feature point B5 will be the same. Even if the input feature point A6 and the reference feature point B5 have different angles and therefore, have different feature vectors, after the input feature point A6 is rotated to have the same angle as that of the reference feature point B5, the rotated input feature points A6 will have the same feature vector as that of the reference feature point B5. This is because the input feature point A6 and the reference feature point B5 are from the same non-fingerprint pattern and have the same surrounding image data.

Figure 7:
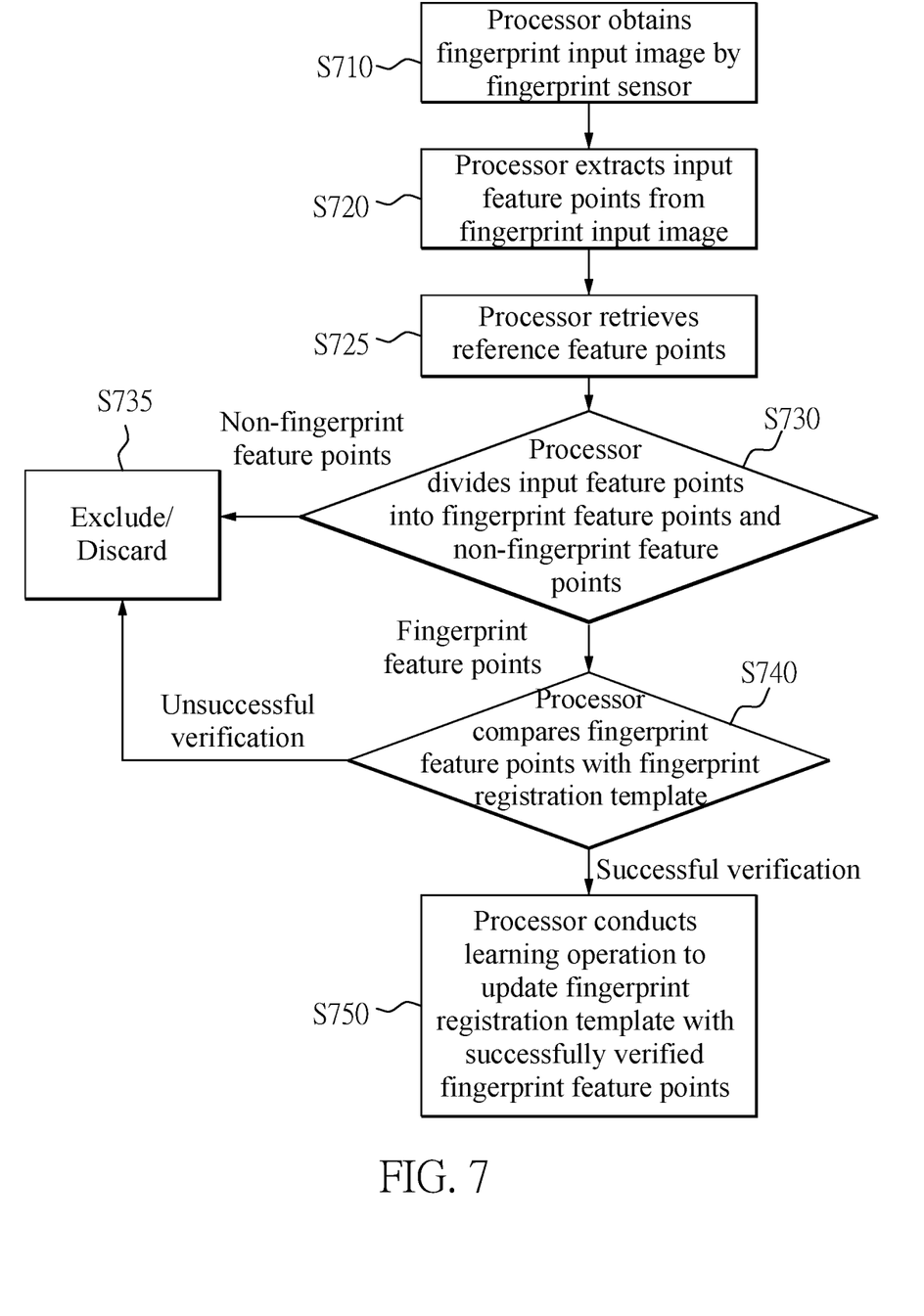
FIG. 7 is a flow chart showing a fingerprint recognition method according to an embodiment of the present disclosure.

Reference is made to FIG. 7, which is a flow chart showing a fingerprint recognition method according to an embodiment of the present disclosure. As shown in FIG. 7, the fingerprint recognition method of the present disclosure includes the following steps:

Step S710: The processor 120 obtains a fingerprint input image by the fingerprint sensor.

Step S720: The processor 120 extracts a plurality of input feature points from the fingerprint input image. Each of the input feature points has an input position, an input angle and an input feature vector.

Step S725: The processor 120 retrieves a plurality of reference feature points. Here, the processor can obtain a plurality of reference feature points from the storage unit, and each of the reference feature points has a reference position, a reference feature vector and a reference angle.

Step S730: The processor 120 divides the plurality of input feature points into fingerprint feature points and non-fingerprint feature points.

Step S735: The processor 120 excludes and discards the non-fingerprint feature points.

Step S740: The processor 120 compares the fingerprint feature points with a fingerprint registration template.

If the verification is unsuccessful, the method proceeds to step S735 where the processor 120 discards the unsuccessful fingerprint feature points.

If the verification is successful, the method proceeds to step S750 where the processor 120 conducts a learning process to update the fingerprint registration template with the successfully verified fingerprint feature points.

In sum, an electronic device for distinguishing between fingerprint feature points and non-fingerprint feature points and a method for the same are provided, in which feature points are extracted from a fingerprint input image obtained by an image sensor (i.e. a fingerprint sensor), and non-fingerprint feature points will be distinguished from fingerprint feature points and deleted. Accordingly, the electronic device for distinguishing between fingerprint feature points and non-fingerprint feature points and the method for the same can prevent the non-fingerprint feature points from existing in a fingerprint registration template of a user, so as to protect fingerprint recognition from being affected by non-fingerprint feature points, thereby increasing safety and accuracy of identity authentication.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for distinguishing between fingerprint feature points and non-fingerprint feature points, applicable to an electronic device, the electronic device including a fingerprint sensor, a processor and a storage unit, and the method comprising:

obtaining a fingerprint input image by using the fingerprint sensor;

extracting a plurality of input feature points from the fingerprint input image by the processor, wherein each of the input feature points has an input position and an input feature vector;

obtaining a plurality of reference feature points by the processor, wherein each of the reference feature points has a reference position and a reference feature vector;

comparing, by the processor, the plurality of input feature points and the plurality of reference feature points, to find at least one input feature point with the input position and the input feature vector being the same as the reference position and the reference feature vector of any of the plurality of reference feature points, and determining the found at least one input feature point as at least one non-fingerprint feature point.

2. The method for distinguishing between fingerprint feature points and non-fingerprint feature points according to claim 1, wherein for each of the input feature points, the input feature vector is calculated according to the input position and image data in a predetermined region around the input feature point, and for each of the reference feature points, the reference feature vector is calculated according to the reference position and image data in a predetermined region around the reference feature point.

3. The method for distinguishing between fingerprint feature points and non-fingerprint feature points according to claim 2, wherein each of the input feature points has an input angle, and the input feature vector is calculated according to the input angle, and each of the reference feature points has a reference angle, and the reference feature vector is calculated according to the reference angle.

4. The method for distinguishing between fingerprint feature points and non-fingerprint feature points according to claim 1, wherein the step of comparing the plurality of input feature points and the plurality of reference feature points by the processor further comprises:

finding at least one input feature point with the input position being different from the reference position of any of the reference feature points; and determining the found at least one input feature point as at least one fingerprint feature point.

5. The method for distinguishing between fingerprint feature points and non-fingerprint feature points according to claim 3, wherein the step of comparing the plurality of input feature points and the plurality of reference feature points by the processor further comprises:

finding at least one input feature point with the input position being the same as the reference position of any of the reference feature points and with the input feature vector and the input angle being different from the reference feature vector and the reference angle of any of the reference feature points;

for each of the found input feature points, rotating the found input feature point according to a difference value between the input angle of the found input feature point and the reference angle of the reference feature point with the reference position being identical to the input position of the found input feature point, so as to make the input angle of the found input feature point the same as the reference angle;

obtaining, according to the reference angle, a rotated input feature vector of the rotated input feature point;

determining whether the rotated input feature vector is identical to the reference feature vector; and if the rotated input feature vector is identical to the reference feature vector, determining the input feature point as a non-fingerprint feature point, and if the rotated input feature vector is not identical to the reference feature vector, determining the input feature point as a fingerprint feature point.

6. The method for distinguishing between fingerprint feature points and non-fingerprint feature points according to claim 3, wherein the step of comparing the plurality of input feature points and the plurality of reference feature points by the processor further comprises:

finding at least one input feature point with the input position and the input angle being identical to the reference position and the reference angle of any of the reference feature points and with the input feature vector being different from the reference feature vector of any of the reference feature points; and determining the found input feature points as fingerprint feature points.

7. An electronic device for distinguishing between fingerprint feature points and non-fingerprint feature points, comprising:

a fingerprint sensor for obtaining a fingerprint input image; and a processor electrically coupled to the fingerprint sensor, configured to perform the following steps:

extracting a plurality of input feature points from the fingerprint input image, wherein each of the input feature points has an input position and an input feature vector;

obtaining a plurality of reference feature points, wherein each of the reference feature points has a reference position and a reference feature vector;

comparing the plurality of input feature points and the plurality of reference feature points to find at least one input feature point with the input position and the input feature vector being the same as the reference position and the reference feature vector of any of the plurality of reference feature points, and determining the found at least one input feature point as at least one non-fingerprint feature point.

8. The electronic device for distinguishing between fingerprint feature points and non-fingerprint feature points according to claim 7, wherein for each of the input feature points, the input feature vector is calculated according to the input position and image data in a predetermined region around the input feature point, and for each of the reference feature points, the reference feature vector is calculated according to the reference position and image data in a predetermined region around the reference feature point.

9. The electronic device for distinguishing between fingerprint feature points and non-fingerprint feature points according to claim 8, wherein each of the input feature points has an input angle, and the input feature vector is calculated according to the input angle, and each of the reference feature points has a reference angle, and the reference feature vector is calculated according to the reference angle.

10. The electronic device for distinguishing between fingerprint feature points and non-fingerprint feature points according to claim 7, wherein the step of comparing the plurality of input feature points and the plurality of reference feature points by the processor further comprises:

finding at least one input feature point with the input position being different from the reference position of any of the reference feature points; and determining the found at least one input feature point as at least one fingerprint feature point.

11. The electronic device for distinguishing between fingerprint feature points and non-fingerprint feature points according to claim 9, wherein the step of comparing the plurality of input feature points and the plurality of reference feature points by the processor further comprises:

finding at least one input feature point with the input position being the same as the reference position of any of the reference feature points and with the input feature vector and the input angle being different from the reference feature vector and the reference angle of any of the reference feature points;

for each of the found input feature points, rotating the found input feature point according to a difference value between the input angle of the found input feature point and the reference angle of the reference feature point with the reference position being identical to the input position of the found input feature point, so as to make the input angle of the found input feature point the same as the reference angle;

obtaining, according to the reference angle, a rotated input feature vector of the rotated input feature point;

determining whether the rotated input feature vector is identical to the reference feature vector; and if the rotated input feature vector is identical to the reference feature vector, the input feature point is determined as a non-fingerprint feature point, and if the rotated input feature vector is not identical to the reference feature vector, the input feature point is determined as a fingerprint feature point.

12. The electronic device for distinguishing between fingerprint feature points and non-fingerprint feature points according to claim 9, wherein the step of comparing the plurality of input feature points and the plurality of reference feature points by the processor further comprises:

finding at least one input feature point with the input position and the input angle being identical to the reference position and the reference angle of any of the reference feature points and with the input feature vector being different from the reference feature vector of any of the reference feature points; and determining the found input feature points as fingerprint feature points.

* * * * *